(12) United States Patent
Aoyama et al.

(10) Patent No.: US 7,917,005 B2
(45) Date of Patent: Mar. 29, 2011

(54) INFORMATION RECORDING DEVICE, INFORMATION RECORDING METHOD, INFORMATION RECORDING PROGRAM AND RECORDING MEDIUM

(75) Inventors: Satoshi Aoyama, Aichi (JP); Nobukazu Ohnishi, Aichi (JP); Shigenori Tsuzuki, Aichi (JP); Junichiro Soeda, Nara (JP); Ryohei Wakai, Osaka (JP)

(73) Assignee: Panasonic Corporation, Osaka (JP)

( * ) Notice: Subject to any disclaimer, the term of this patent is extended or adjusted under 35 U.S.C. 154(b) by 1198 days.

(21) Appl. No.: 11/578,707

(22) PCT Filed: Aug. 30, 2005

(86) PCT No.: PCT/JP2005/015783
§ 371 (c)(1),
(2), (4) Date: Oct. 17, 2006

(87) PCT Pub. No.: WO2006/025398
PCT Pub. Date: Mar. 9, 2006

(65) Prior Publication Data
US 2007/0242932 A1    Oct. 18, 2007

(30) Foreign Application Priority Data
Sep. 3, 2004    (JP) .................................. 2004-257233

(51) Int. Cl.
*H04N 9/80* (2006.01)
(52) U.S. Cl. .................................. 386/247; 711/2; 711/4
(58) Field of Classification Search .................. 386/46, 386/95, 96, 124–126, 200, 213, 247, 253, 386/264; 711/2, 4; 714/7, 8
See application file for complete search history.

(56) References Cited

U.S. PATENT DOCUMENTS

| | | | |
|---|---|---|---|
| 6,181,870 B1 | 1/2001 | Okada et al. | |
| 6,219,311 B1 | 4/2001 | Mitsuno | |
| 6,353,704 B1 | 3/2002 | Nakatani et al. | |
| 6,389,569 B1 | 5/2002 | Chung et al. | |
| 6,594,725 B2 * | 7/2003 | Ando et al. | 711/112 |
| 2004/0252980 A1 * | 12/2004 | Watanabe | 386/96 |

FOREIGN PATENT DOCUMENTS

| | | |
|---|---|---|
| EP | 0 903 744 | 3/1999 |
| EP | 0 953 977 | 11/1999 |
| JP | 2000-13728 | 1/2000 |
| JP | 2000-112672 | 4/2000 |
| JP | 2001-67802 | 3/2001 |
| JP | 2004-192661 | 7/2004 |

OTHER PUBLICATIONS

Supplementary European Search Report issued Feb. 5, 2009 in the Application No. EP 05 77 6070.

* cited by examiner

*Primary Examiner* — Thai Tran
*Assistant Examiner* — Mishawn Dunn
(74) *Attorney, Agent, or Firm* — Wenderoth, Lind & Ponack, L.L.P.

(57) ABSTRACT

A CDA processing section extracts an unused area of an information recording medium via a disc status management section and a drive control section. The CDA processing section divides the extracted unused areas by a division criteria value MAS, which allows continuous reproduction of a video and audio stream, and reserves areas having the size of the division criteria value MAS as CDAs. This enables continuous reproduction of AV data, and multiple data can be recorded simultaneously.

24 Claims, 11 Drawing Sheets

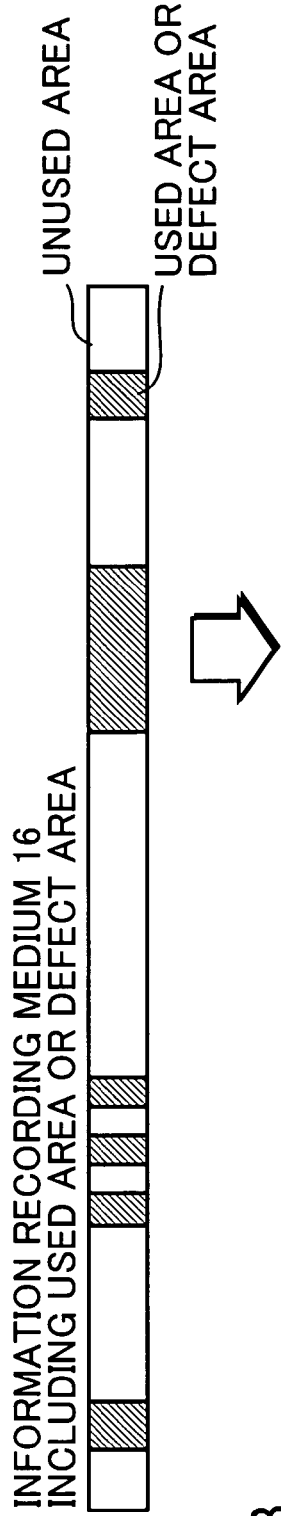
FIG. 8A INFORMATION RECORDING MEDIUM 16 INCLUDING USED AREA OR DEFECT AREA
FIG. 8B CONVENTIONAL CDA RESERVATION: UNEVEN SIZE
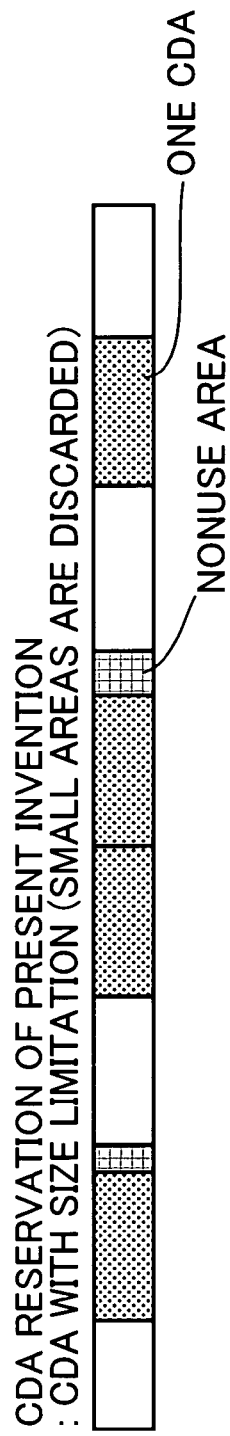
FIG. 8C CDA RESERVATION OF PRESENT INVENTION : CDA WITH SIZE LIMITATION (SMALL AREAS ARE DISCARDED)
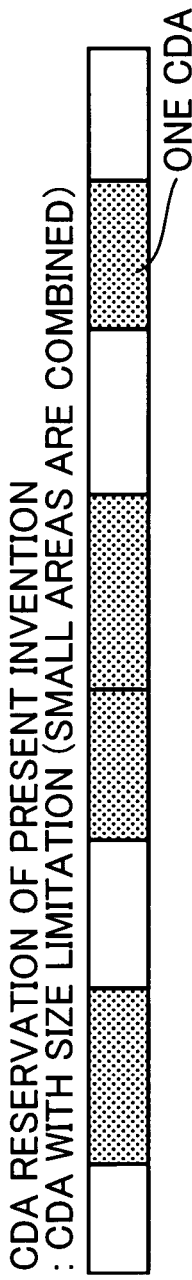
FIG. 8D CDA RESERVATION OF PRESENT INVENTION : CDA WITH SIZE LIMITATION (SMALL AREAS ARE COMBINED)

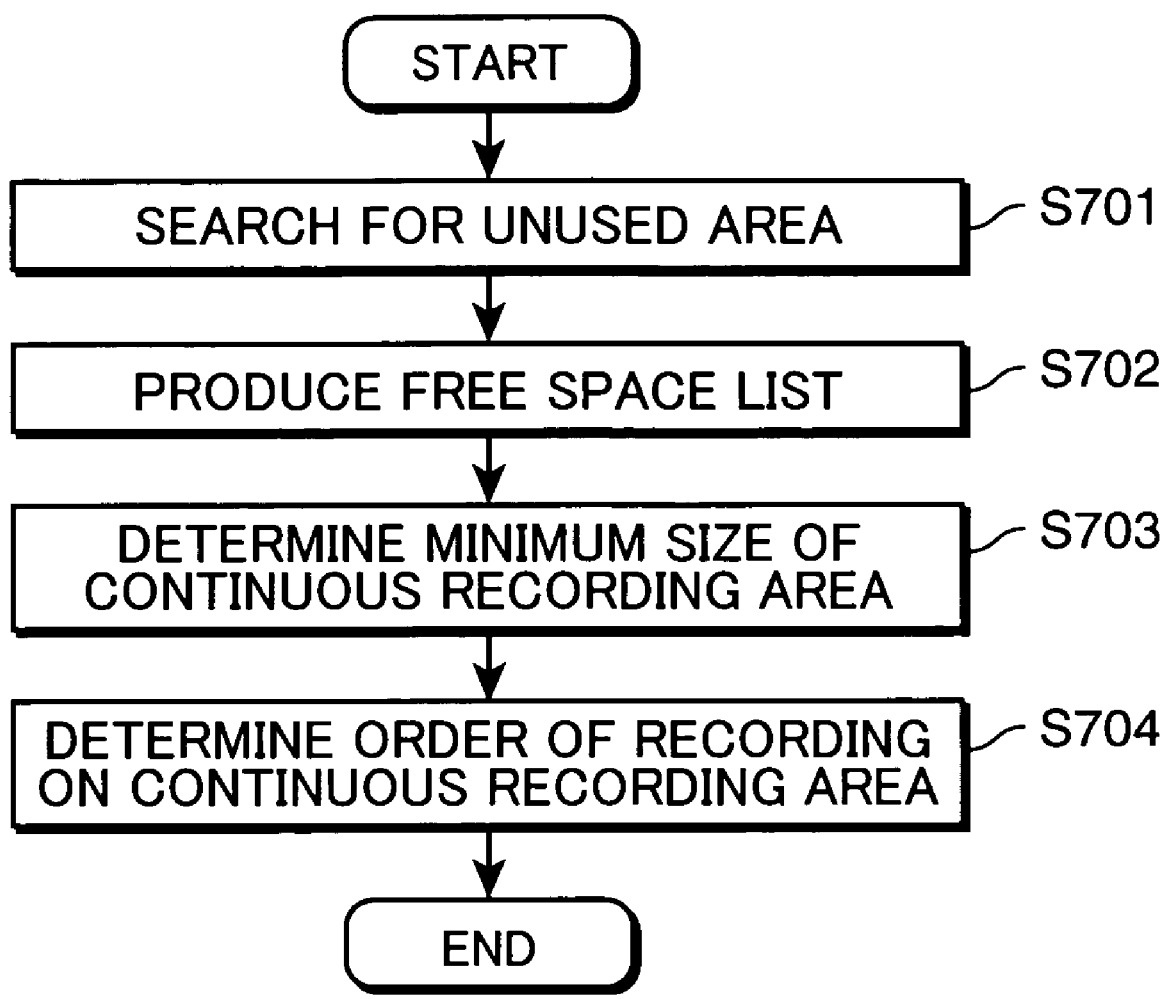

INFORMATION RECORDING DEVICE, INFORMATION RECORDING METHOD, INFORMATION RECORDING PROGRAM AND RECORDING MEDIUM

TECHNICAL FIELD

The present invention relates to an information recording device for recording data on an information recording medium, an information recording method, an information recording program and a recording medium.

BACKGROUND ART

As a conventional art in the technical field, an optical disc recording apparatus shown in Patent Document 1 is known. An object of the optical disc recording apparatus shown in Patent Document 1 is to ensure smooth continuous reproduction when video and audio data which has been recorded on an information recording medium is being reproduced.

In order to achieve this object, in the optical disc recording apparatus shown in Patent Document 1, a recording area of the information recording medium is divided into a plurality of small areas (continuous recording areas), and information is recorded on and read out from on a basis of the divided continuous recording areas.

FIG. 11 is a flow chart showing a process for reserving continuous recording areas which is performed by the optical disc recording apparatus shown in Patent Document 1. First, unused areas on the optical disc are searched for (S701), and a free space list indicating unused areas is produced based on the search result (S702). An unused area is picked out from the produced free space list, and a minimum size of a continuous recording area for this unused area is determined (S703). If the unused area is larger than the minimum size, the unused area is reserved as one of the continuous recording areas and an order of recording on the reserved continuous recording areas is decided (S704). The order of recording is decided to be one with which the reserved continuous recording areas are used in an order from an inner peripheral side to the outer peripheral so that a head seeking operation for recording is reduced to the lowest level, for example.

Patent Document 1: Japanese Laid-Open Publication No. 2000-13728

However, the optical disc recording apparatus shown in Patent Document 1 has a problem that multiple types of data streams cannot be recorded at the same time on a new information recording medium which has never been used or an information recording medium which has no defect area at all, i.e., an information recording medium which has only one unused area because only one continuous recording area is reserved on such a recording medium.

SUMMARY OF THE INVENTION

An object of the present invention is to provide an information recording device, an information recording method, an information recording program and a recording medium which allow recording of multiple types of data streams at the same time even on an information recording medium which has only on unused area, and which also allow continuous reproduction of a video audio stream.

In order to solve the above problem, the present invention provides an information recording device for reserving continuous areas on an information recording medium and sequentially recording data on the reserved continuous recording areas, comprising: extraction means for extracting unused areas from the information recording medium; determination means for determining whether the unused area extracted by the extraction means exceeds a division criteria value larger than a lower limit of the continuous recording areas which allows continuous reproduction of a video and audio stream; dividing means for dividing unused areas which are determined to have a size exceeding the division criteria value by the determination means by the division criteria value; and management means for reserving areas which are divided by the dividing means and have the size of the division criteria value as the continuous recording areas.

According to this configuration, the unused area with no data recorded thereon is extracted from the information recording medium, and it is determined whether the extracted unused area exceeds a division criteria value larger than the lower limit of the continuous storage area which allows continuous reproduction of a video and audio stream. If it is determined to exceed, the unused area is divided by the division criteria value, and the areas which now have the size of division criteria value are reserved as continuous recording areas.

Thus, even when the information recording medium has only one unused area, the unused area is divided by the division criteria value and a plurality of continuous recording areas are reserved on the information recording medium. Accordingly, a plurality of data streams can be recorded at the same time. Since the continuous recording areas have the size larger than the lower limit of the continuous recording area which allows the continuous reproduction of a video and audio stream, when a video and audio stream is sequentially recorded on the continuous recording area, the video and audio stream can be reproduced sequentially.

BRIEF DESCRIPTION OF THE DRAWINGS

FIGS. 8A through 8D are diagrams showing how the CDAs are reserved on the information recording medium.

FIG. 11 is a flow chart according to a conventional technique.

DETAILED DESCRIPTION OF PREFERRED EMBODIMENTS OF THE INVENTION

Hereinafter, embodiments of the present invention will be described with reference to the drawings.

Embodiment 1

Figure 1:
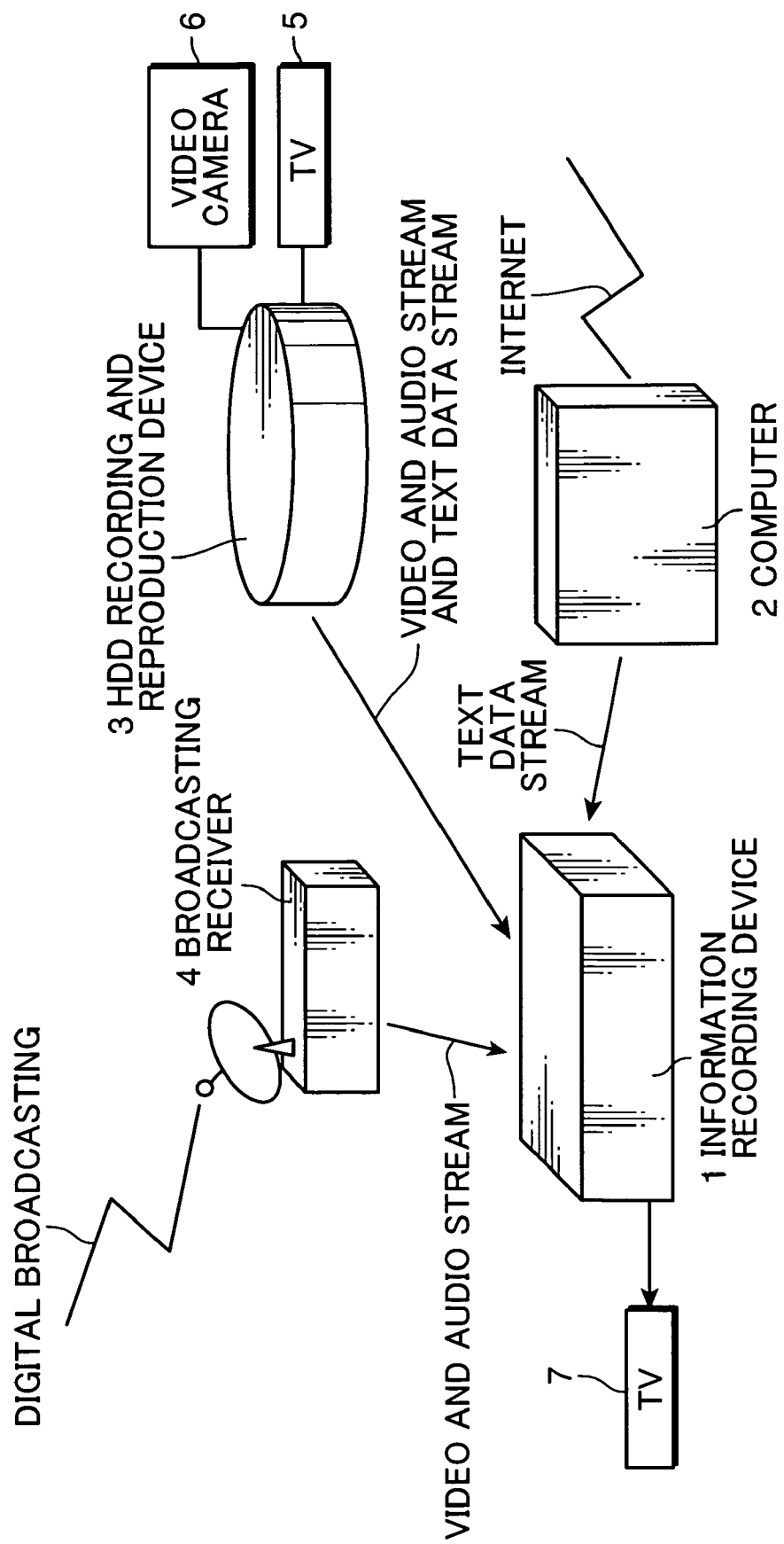
FIG. 1 is a diagram of an example showing how an information recording device according to Embodiment 1 of the present invention is used.

FIG. 1 is a diagram of an example showing how an information recording device 1 according to Embodiment 1 of the present invention is used. The information recording device 1 records various data streams on an information recording medium 16, including optical discs such as digital versatile discs (DVDs), CD-ROMs, PDs, magneto-optical discs (MOs) and the like, and also reproduces various data streams recorded on the information recording medium 16. In other words, the information recording device 1 is a device for recording data streams on the information recording medium 16 based on optical principles of DVD recorders and the like. In the example of FIG. 1, the information recording device 1 is connected to a computer 2, an HDD recording and reproduction device 3, a broadcasting receiver 4 and a television 7.

The information recording device 1 according to the present embodiment conforms to the video recording (VR) standard. The information recording device 1 divide the recording area of the information recording medium 16 into units of small areas called contiguous data areas (CDAs) to manage them, and sequentially records video and audio streams (AV data) on the CDAs. The CDA is an example of the continuous recording areas.

The computer 2 is connected to, for example, the Internet. The computer 2 obtains various text data streams via the Internet, and outputs them to the information recording device 1. Herein, the text data streams may be, for example, HTML data and the like downloaded from the Internet.

The computer 2 does not have to be connected to the Internet. The text data stream is not limited to the one downloaded from the Internet, but it may be a data stream produced by using application software.

The computer 2 may receive information other than the text data stream, for example, video and audio stream or still image data stream, and output the various data streams to the information recording device 1. Herein, the video and audio stream may be motion picture data such as MPEG and the like downloaded from the Internet, and the still image data stream may be image data such as JPEG and the like downloaded from the Internet.

The HDD recording and reproduction device 3 is a device including a magnetic disc of a large capacity, and records video and audio streams and text data streams received by a television 5, video and audio streams shot by a video camera 6 and the like on the magnetic disc. The HDD recording and reproduction device 3 reproduces these recorded data streams to have the television 5 or the like display them, and also, outputs these recorded data streams to the information recording device 1.

The broadcasting receiver 4 is formed of a tuner for receiving radio waves of digital terrestrial broadcasting, and demodulates the received radio waves to extract the video and audio streams. The broadcasting receiver 4 records/reproduces the extracted video and audio streams and outputs them to the information recording device 1. The broadcasting receiver 4 is not limited to a receiver for receiving digital broadcasting, and it may be a receiver for receiving analog broadcasting, or a receiver without a recording and reproduction function.

As an example of the information recording device 1, the device for recording data streams on the information recording medium 16 based on optical principles is illustrated. However, the information recording device 1 is not limited to such a device, and it may be a device for recording data streams on an information recording medium of various shapes such as a disc shape, a square shape, a parallelepiped shape and the like based on optical principles, magnetic principles, electric/electronic principles, chemical principles, physical principles, or a combination of a few of these principles. Herein, the information recording device based on the electric/electronic principles may be, for example, a semiconductor memory of a large capacity, such as USB memory. The device based on the magnetic principles may be a hard disc drive.

Figure 2:
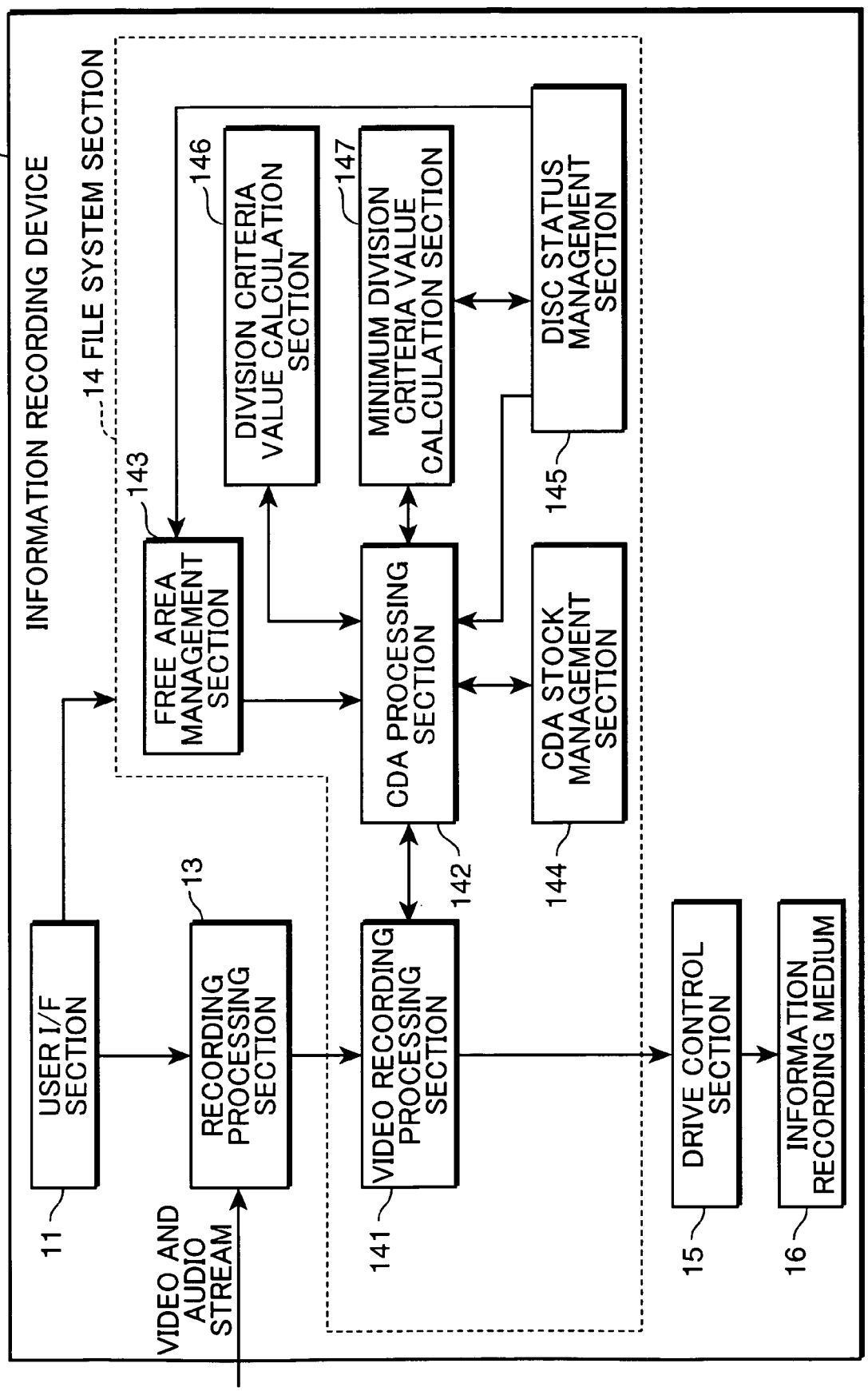
FIG. 2 is a block diagram of the information recording device according to Embodiment 1.

FIG. 2 is a block diagram of the information recording device 1. The information recording device 1 includes a user interface (I/F) section 11, a recording processing section 13, a file system section 14, a drive control section 15 and the information recording medium 16. The file system section 14 includes a video recording processing section 141, a CDA processing section 142, a free area management section 143, a CDA stock management section 144, a disc status management section 145, a division criteria value calculation section 146, and a minimum division criteria value calculation section 147.

The user I/F section 11 is formed of a light receiving element for receiving infrared ray carrying an operation instruction output from operational buttons of the information recording device 1 or an operational remote controller, and receives various operational instructions issued by a user.

When the user I/F section 11 receives the operation instruction for recording by the user, the recording processing section 13 obtains a video and audio stream transmitted by another equipment, treats the obtained video and audio stream with a predetermined signal processing, and outputs the stream to the video recording processing section 141.

The video recording processing section 141 receives CDA information from the CDA processing section 142 which indicates an address of a CDA to which the video is to be recorded on the information recording medium 16. The video recording processing section 141 controls the drive control section 15 such that the video and audio stream is recorded on the CDA indicated by the received CDA information, and records the video and audio stream on the information recording medium 16.

The CDA processing section 142 selects one of the unused areas on the information recording medium 16 with reference to the free space list stored in the free area management section 143, and treats the selected unused area with a process for reserving CDAs. The CDA processing section 142 generates CDA information of the reserved CDAs, and stores the generated CDA information in the CDA stock management section 144.

Then, when the CDA processing section 142 receives a CDA request from the video recording processing section 141, it specifies one or a plurality of unused CDAs to be used for recording the video and audio streams with reference to the CDA stock management section 144, and outputs the CDA information corresponding to the specified CDAs to the video recording processing section 141. Further, when the CDA processing section 142 receives information from the video recording processing section 141 which indicates that the video and audio data stream is recorded on a certain CDA, it sends information to the CDA stock management section 144 which indicates that the CDA has already been used. The CDA processing section 142 may perform a process of reserving CDAs when it receives a CDA request from the video recording processing section. Further, the CDA processing section 142 specifies areas of the information recording medium 16 which are objects of calculation for the minimum division criteria value MIS to the minimum division criteria value calculation section 147, and have the minimum division criteria value calculation section 147 calculate the minimum division criteria value MIS of the specified area. Herein, the CDA processing section 142 specifies the area to become an object of calculation for the division criteria value MIS with reference to the free space list stored in the free area management section 143 and the defect areas managed by the disc status management section 145.

The CDA stock management section 144 stores the CDA information for the respective CDAs generated by the CDA processing section 142 in association with information indicating whether the CDAs are used or unused.

The minimum division criteria value calculation section 147 picks out an area from the information recording medium 16 and calculates a minimum division criteria value MIS for the picked out area using Equation 1. The minimum division criteria value MIS corresponds to an example of the lower limit value.

$$MIS=dN\_ecc+Vo\times(Tj+Ts)/((16\times8\times2048)\times(1-Vo/Vr)) \quad (1)$$

Herein:

dN_ecc represents a total of the size of defect areas included in the picked out area (the number of Error Correcting Code (ECC) blocks) and the size of the used areas (the number of the ECC blocks);

Vr represents an input transfer rate from the information recording medium 16 to the buffer;

Vo represents an output transfer rate from the buffer to a decoder;

Tj represents a maximum seek time; and

Ts is time required for skipping (reading) the defect areas included in the picked out area, which varies depending upon dN_ecc.

Equation 1 is an Equation representing the right side of Equation 2. Equation 2 is an Equation for determining whether the area picked out from the information recording medium 16 satisfies Condition 1 and Condition 2 for defining continuous reproduction of video and audio streams, which will be described below.

$$N\_ecc \geq dN\_ecc+Vo\times(Tj+Ts)/((16\times8\times2048)\times(1-Vo/Vr)) \quad (2)$$

Herein, N_ecc represents the number of ECC blocks of the area picked out from the information recording medium 16.

Figure 3:
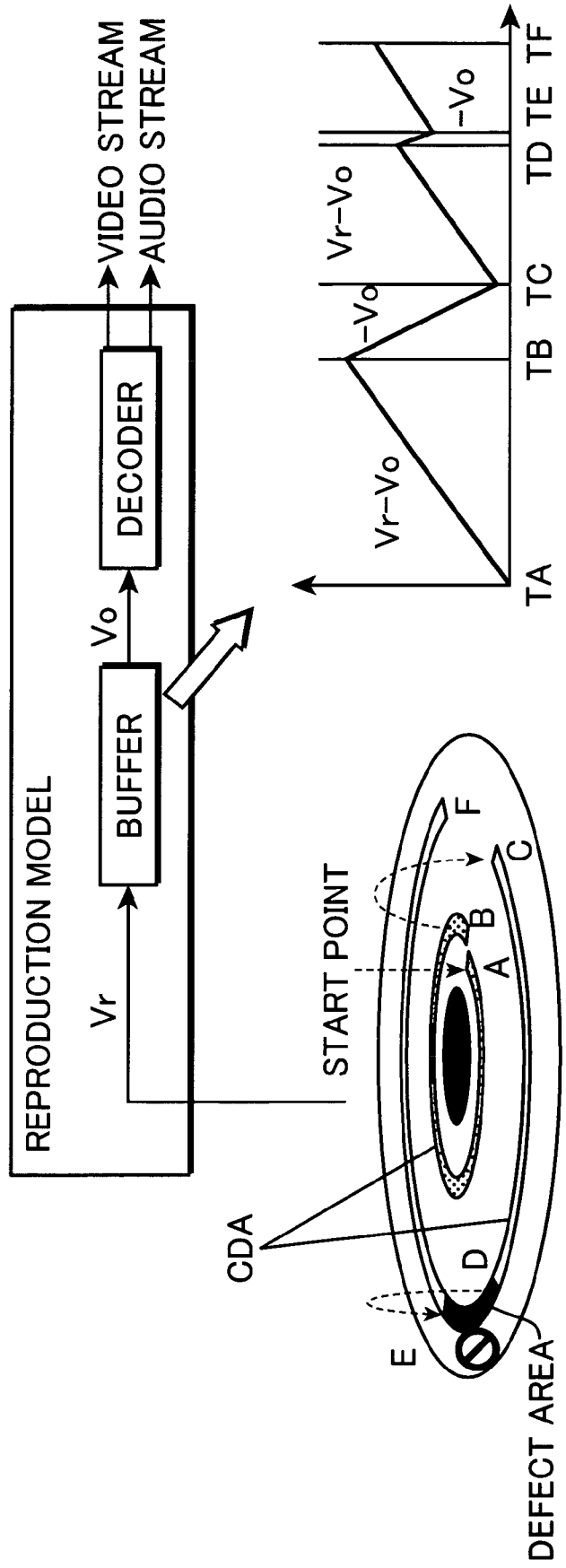
FIGS. 3A through 3C are diagrams for illustrating Conditions 1 and 2 which enable continuous reproduction of a video and audio stream.

FIGS. 3A through 3C are diagrams for illustrating the above-mentioned Conditions 1 and 2: FIG. 3A schematically shows CDAs reserved on the information recording medium 16; FIG. 3B is a block diagram showing a flow of a process for treating video and audio streams during reproduction; and FIG. 3C shows a relationship between the input transfer rate Vr of a video and audio stream input to the buffer and the output transfer rate Vo of a video and audio stream output from the buffer.

In FIG. 3A, an area having a partially broken spiral shape represents one CDA. The vertical axis in FIG. 3C indicates a data amount stored in the buffer. Letters TA through TF shown along the horizontal axis represent timing for reading out points A through F shown in FIG. 3A. The buffer shown in FIG. 3B temporarily stores a video and audio stream read out from the information recording medium 16 during reproduction. The decoder reads out the video and audio stream from the buffer, decodes the stream to separate into an audio stream and a visual stream, and outputs the streams to a display device which is not shown.

Condition 1 is that, during reproduction of the information recording medium 16, in any certain time period (a predetermined value) selected from one CDA, the video and audio stream has to be reproduced without any interruption within that period. Regarding the area from point A to point B shown in FIG. 3A, the data amount of the buffer does not go below zero as shown in FIG. 3C and the buffer does not underflow. Thus, the area from point A to point B is reserved as one CDA. In the area from point C to point F shown in FIG. 3A, the area from point D to point E is a defect area. However, since the buffer does not underflow during a time period from TD to TE as shown in FIG. 3C, the area from point C to point F is reserved as one CDA. If the buffer underflows during the time period from TD to TE, the area from point C to point D is reserved as one CDA.

Condition 2 is that the buffer should not underflow within the maximum seek time between two CDAs of the information recording medium 16 (the seek time from the innermost CDA to the outermost CDA). The seek time is defined as 1500 ms. Thus, CDAs have to be reserved such that a data amount which can stand the seek time of 1500 ms is stored at time TB shown in FIG. 3C.

The minimum value which satisfies Conditions 1 and 2 is the right side of Equation 2, i.e., the minimum division criteria value MIS. The minimum division criteria value MIS is, for example, about 20 MB. The minimum division criteria value MIS may vary depending upon the areas of the information recording medium 16.

The disc status management section 145 shown in FIG. 2 detects unused areas and used areas on the information recording medium 16 via the drive control section 15, and outputs the detected result to the free area management section 143. The disc status management section 145 further detects defect areas on the information recording medium 16 and stores information indicating which of the areas on the information recording medium 16 are defect areas for managing the defect areas.

The free area management section 143 produces a free space list, which indicates which of the areas on the information recording medium 16 are used areas and which are unused areas, based on the detection result on the unused areas and used areas which is output from the disc status management section 145, and stores the produced free space list.

The division criteria value calculation section 146 calculates an estimated value of the maximum value among the minimum division criteria values MIS which are calculated for respective areas (the worst value among the minimum division criteria values MIS of the information recording medium 16), and have the division criteria value calculation section 146 store a value obtained by adding a certain margin to the estimated value as a division criteria value MAS.

Hereinafter, a method for calculating the division criteria value MAS will be described. With respect to the horizontal axis of a graph shown in FIG. 3C, if a certain time period is Tsi, and a time period during which the slope is −Vo within the time period Tsi (a time period required for skipping the defect areas) is Ts, the amount of data stored in the buffer and the amount of consumption of data read out from the buffer should satisfy the relationship of storage amount≧consumption amount in order to prevent underflow of the buffer within the time period Tsi. In other words, Equation 3 needs to be satisfied.

$$(Vr-Vo)\times(Tsi-Ts) \geq Vo\times Ts \quad (3)$$

A ratio of Tsi to Ts calculated using a boundary condition of Equation 3, which is $(Vr-Vo)\times(Tsi-Ts)=Vo\times Ts$, equals to a ratio of N_ecc to dN_ecc as shown in Equation 2. This means that N_ecc/dN_ecc=Tsi/Ts=α. When this Equation is substituted in a boundary condition of Equation 2, following Equation 4 is obtained.

$$N\_ecc = (1/\alpha) \times N\_ecc + Vo \times (Tj+Ts)/((16 \times 8 \times 2048) \times (1-Vo/Vr)) \quad (4)$$

Then, the division criteria value calculation section 146 substitutes predetermined values for calculating the worst value of the minimum division criteria value MIS into $\alpha$, Vo, Tj, Ts, and Vr shown in Equation 4 to calculate N_ecc. In Equation 4, predetermined values for obtaining the worst value of the minimum division criteria values MIS are used for $\alpha$, Vo, Tj, Ts, and Vr. Thus, the division criteria value MAS has a constant value for all the areas, unlike the minimum division criteria values MIS.

However, for copying video and audio streams recorded on another information recording medium to the information recording medium 16, if a variance in the output transfer rate Vo in the original information recording media depending upon its areas can be recognized beforehand for recording the video and audio streams on the information recording medium 16, the division criteria value MAS may be calculated for each area based on the area of the areas information recording medium 16 on which the original video and audio stream is to be recorded and its output transfer rate. Further, if the upper limit of the output transfer rate Vo to the buffer which varies depending upon a recording mode set by a user can be restricted, the division criteria value MAS corresponding to the recording mode set by the user may be calculated.

In the present embodiment, the CDA processing section 142, the disc status management section 145, and the drive control section 15 are examples of extraction means. The CDA processing section 142 is an example of determination means and separation means. The CDA processing section 142 and the CDA stock management section 144 is an example of the management means. The division criteria value calculation section 146 is an example of the division criteria value calculation means.

Figure 4:
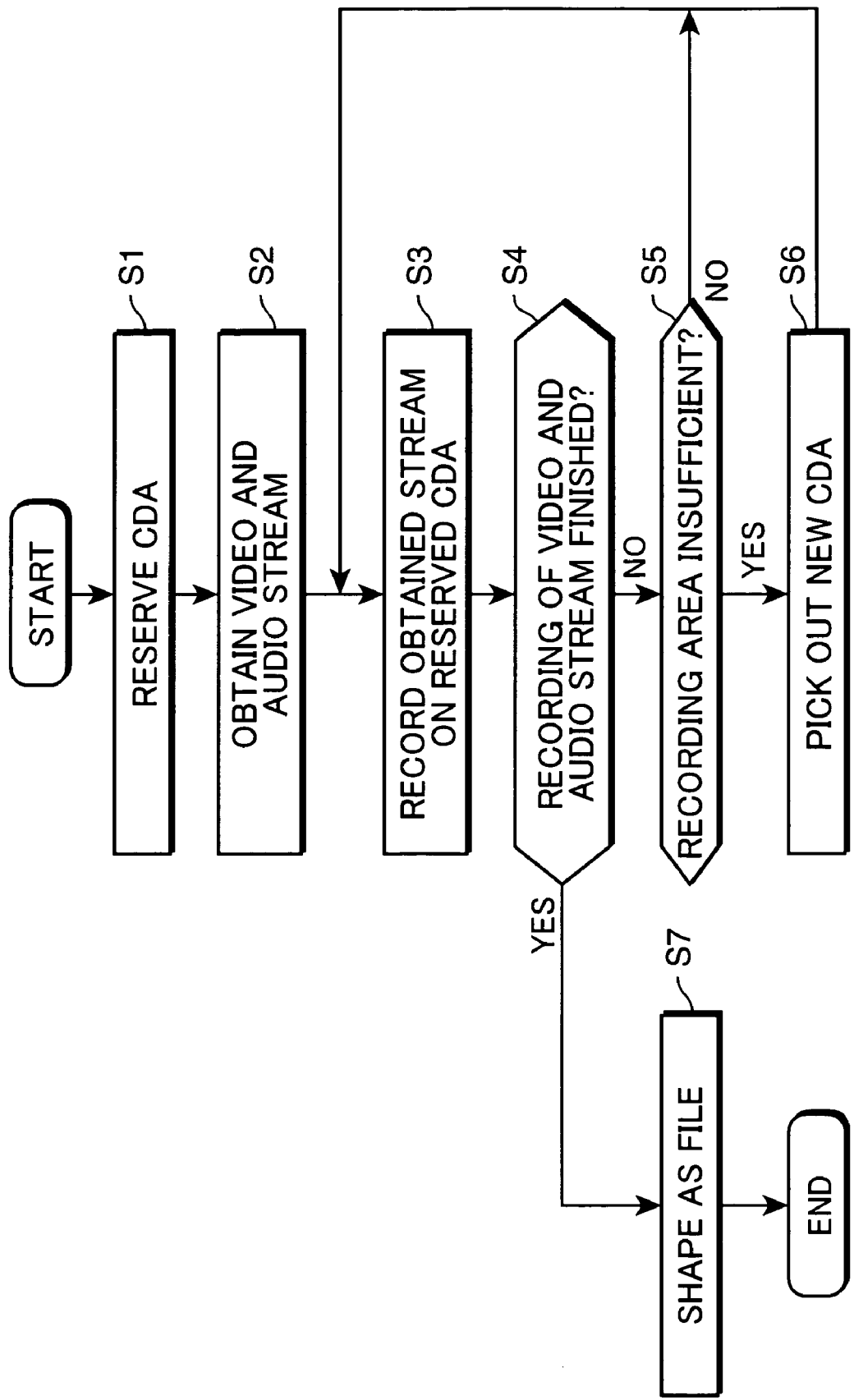
FIG. 4 is a flow chart showing a process by the information recording device according to Embodiment 1 to record a video and audio stream on an information recording medium.

FIG. 4 is a flow chart showing a process by the information recording device 1 shown in FIG. 2 to record a video and audio stream on the information recording medium 16. First, at step S1, for example, the user I/F section 11 receives an operational instruction to record a video and audio stream on the information recording medium 16, and the file system section 14 receives an instruction for recording a video and audio stream on the information recording medium 16. At that time, the video recording processing section 141 outputs a reservation request to the CDA processing section 142 for reserving CDAs on the information recording medium 16, and have the CDA processing section 142 reserve the CDAs. The details of the process for reserving CDAs on the information recording medium 16 will be described below.

In step S2, the recording processing section 13 obtains video and audio streams output from the computer 2, the HDD recording and reproduction device 3, or the broadcasting receiver 4 shown in FIG. 1, treats them with a predetermined process (for example, signal processing such as compression process), and outputs the streams to the video recording processing section 141. The process performed by the recording processing section 13 is known, and is not directly related to the present invention. Thus, the detailed explanation thereof is omitted.

In step S3, the video recording processing section 141 outputs a CDA request to the CDA processing section 142. The CDA processing section 142 refers to the CDA stock management section 144 and reads out CDA information of one or a plurality of unused CDAs to output them to the video recording processing section 141. The video recording processing section 141 controls the drive control section 15 such that the video and audio streams output from the recording processing section 13 are recorded on the CDA indicated by the CDA information output from the CDA processing section 142.

In step S4, the video recording processing section 141 determines whether recording of the video and audio stream is finished or not. If recording of the video and audio stream has been finished (YES at S4), the video and audio stream recorded on the CDA is shaped so as to conform to a predetermined file system (S7), and the recording of the video and audio stream is finished.

This process is performed by the file system section 14, particularly, the video recording processing section 141 and/or the disc status management section 145. In general, the process is same as a process performed by a common optical disc recording and reproduction device and the like, and is not directly related to an essential part of the present invention. Thus, the explanation thereof is omitted.

In step S5, if there is a CDA which not yet has a video and audio stream recorded thereon among the CDAs corresponding to all of the CDA information received from the CDA processing section 142, the video recording processing section 141 determines that there is no shortage of recording areas (NO at S5). The process returns to step S3, and the remaining video and audio streams are sequentially recorded on the unused CDAs.

On the other hand, in step S5, if the CDAs corresponding to all of the CDA information received from the CDA processing section 142 have the video and audio streams recorded thereon, the video recording processing section 141 determines that the recording areas are insufficient (YES at S5). The video recording processing section 141 outputs a CDA request to the CDA processing section 142 and have it outputs CDA information on unused CDAs.

As the process from steps S3 to S6 is repeated, all the video and audio streams are eventually recorded on the CDAs and the status is shaped as a file to complete the recording of the video and audio streams on the information recording medium 16.

A process for reserving CDAs on the information recording medium 16 at step S1 may be carried out depending upon a result of a determination made when a new information recording medium 16 is attached to the information recording device 1 as to whether CDAs have already been reserved on the attached information recording medium 16. Alternatively, the process may be carried out based on some kind of an operational instruction (for example, "Reserve CDAs" and the like) issued by a user using the user I/F section 11 when a new information recording medium 16 is attached to the information recording device 1.

In this case, the CDAs are previously reserved automatically or by an operation of the user. At the time when the video and audio streams are actually recorded on the information recording medium 16, the CDAs have already been reserved. Thus, the video and audio streams can be recorded rapidly on the information recording medium 16.

Figure 5:
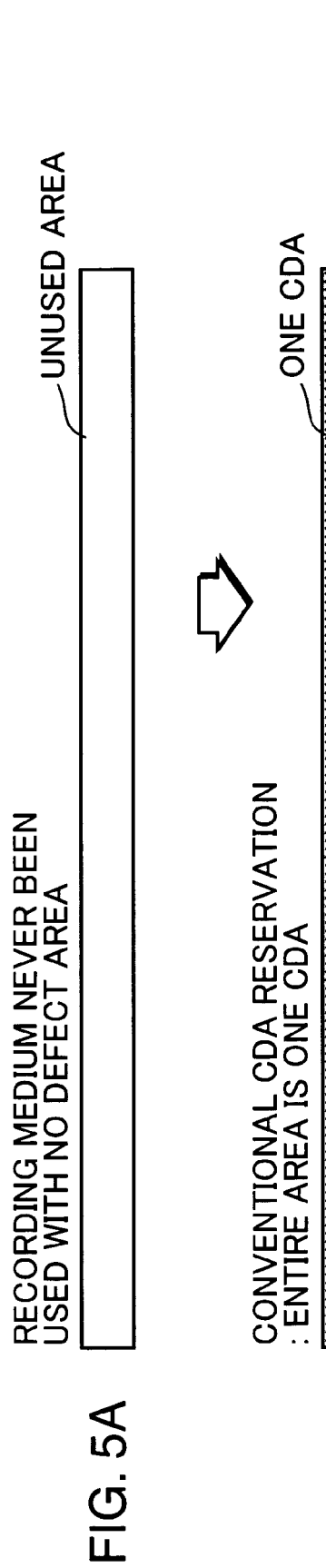
FIGS. 5A through 5C are diagrams showing how CDAs are reserved on the information recording medium.

FIGS. 5A through 5C show how CDAs are reserved on the information recording medium 16. FIG. 5A shows a recording area of the information recording medium 16 with no data recorded thereon and no area to which data cannot be recorded due to damages and the like (defect area). FIG. 5B shows a recording area in the case where a conventional information recording device reserves CDAs on the recording area shown in FIG. 5A. FIG. 5C shows a recording area in the case where the present information recording device 1 reserves CDAs on the recording area shown in FIG. 5A.

As shown in FIG. 5A, if the information recording medium 16 has no data recorded thereon at all and has no defect area at all, with a conventional information recording device, the entire area is reserved as one CDA as shown in FIG. 5B.

On the other hand, with the present information recording device 1, a plurality of CDAs are always reserved even on the information recording medium 16 which has never been used and has no defect area, as will be described below.

Figure 6:
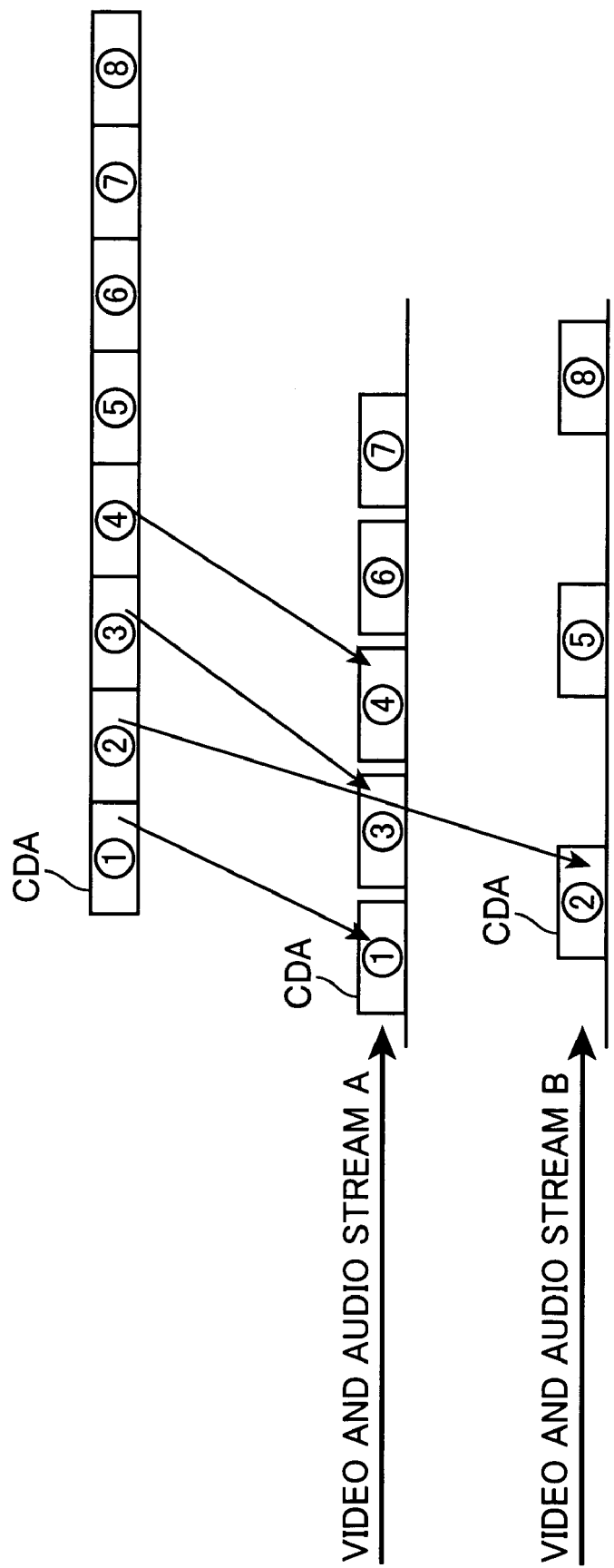
FIG. 6 is a diagram for illustrating a process of recording two types of video and audio streams on the information recording medium at the same time.

Therefore, as shown in FIG. 6, even when video and audio stream A and video and audio stream B are input at the same time, the video recording processing section 141 sequentially allocates CDAs to the video and audio streams which are input simultaneously such that the video and audio stream A is recorded sequentially on CDA1, CDA3, CDA4, CDA6, and CDA7, and the video and audio stream B is recorded sequentially on CDA2, CDA5, and CDA8. In this way, a plurality of video and audio streams can be recorded on the information recording medium 16 at the same time.

Figure 7:
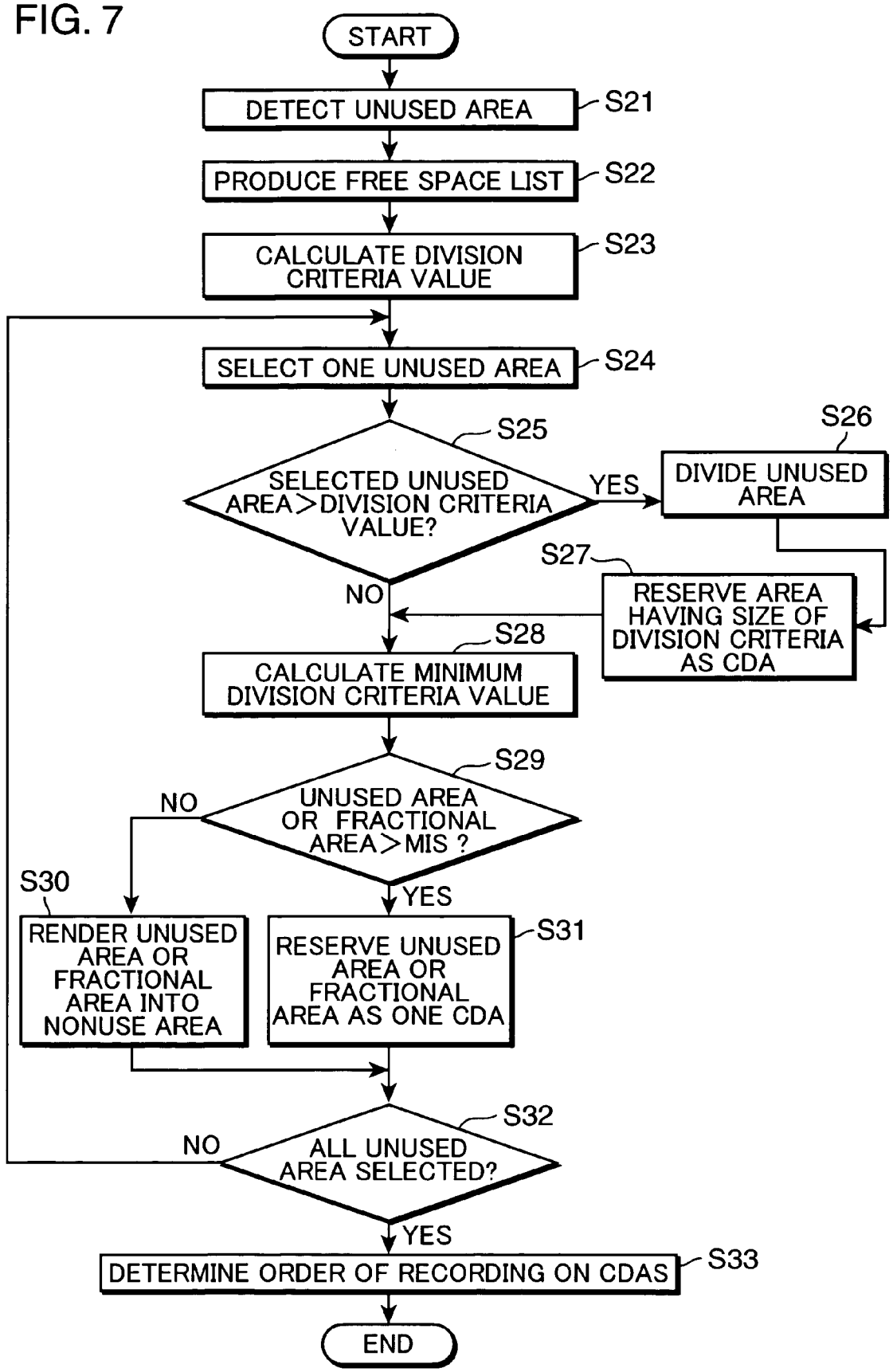
FIG. 7 is a flow chart showing the process of reserving the CDAs on the information recording medium.

Next, a process for reserving the CDAs on the information recording medium 16 will be described. FIG. 7 is a flow chart showing the process. The flow chart starts from the point where an instruction to start recording on the information recording medium 16 is input to the file system section 14, where an information recording medium 16 with no CDA reserved thereon is attached to the information recording device 1, or where an information recording medium 16 with no CDA reserved thereon is attached to the information recording device 1 and the user performs some kind of operation using the user I/F section 11.

First, in step S21, the disc status management section 145 reads out the status of the information recording medium 16 via the drive control section 15, detects unused areas and used areas from the information recording medium 16, and outputs the detected result to the free area management section 143.

If the information recording medium 16 has never been used since it was produced, and has no defect area at all, the information recording medium 16 has one unused area (area illustrated as an open square) as shown in FIG. 5A. On the other hand, if there is a used area or a defect area in some part of the information recording medium 16, the information recording medium 16 has a plurality of unused areas since the unused area are divided by the used area or the defect area (areas indicated by diagonal lines drawn to the lower left) as shown in FIG. 8A.

However, the arrangement of the used areas or defect areas shown in FIG. 8A is merely an example, and the number and the size of the used areas or the defect areas are not necessarily limited to those shown in FIG. 8A.

In step S22, when the free area management section 143 receives a detection result for unused areas and used areas from the disc status management section 145, it produces a free space list based on the detection result. The production of the free space list does not have to be performed only once for each information recording medium 16, but may be performed for a plurality of times, or may be performed for a specific area of the information recording medium 16 as necessary.

Further, the production of the free space list does not have to be performed by the free area management section 143, but may be performed by the disc status management section 145 or the CDA processing section 142 and the produced free space list may be passed to the free area management section 143, or may be performed cooperatively by the free area management section 143, the disc status management section 145 and the CDA stock management section 144.

In step S23, the division criteria value calculation section 146 obtains a predicted value of the worst value of the minimum division criteria value MIS using the above-mentioned Equation 4, and calculates the maximum division criteria value MAS by adding a certain margin (allowance) to the predicted value.

Herein, the margin may be, for example, a value which allows to ensure stable reproduction, a value which allows to ensure more compatibility between equipment; a value which covers future changes in specifications or performance, a value which covers specification change or performance change and/or a variance in defect areas of the information recording medium 16, a value which allows avoiding recording on defect areas detected during recording, or values obtained based on various reasons.

In step S24, the CDA processing section 142 selects one unused area from the information recording medium 16 with reference to the free space list managed by the free area management section 143 and determines whether the size of the selected unused area exceeds the maximum division criteria value MAS.

In step S25, if the CDA processing section 142 determines that the selected unused area exceeds the maximum division criteria value MAS (YES at S25), it divides the selected unused area by the division criteria value (S26). In step S27, the CDA processing section 142 reserves the areas having the size of the maximum division criteria value MAS among the areas divided by the division criteria value as CDAs.

In this case, for example, even though the entire information recording medium 16 is one unused area as shown in FIG. 5A, a plurality of CDAs can be reserved from the unused area as shown in FIG. 5C. Thus, it becomes possible to prevent reserving only one CDA on the information recording medium 16 as shown in FIG. 5B. Accordingly, a plurality of CDAs are reserved on the information recording medium 16, and a plurality of data streams can be recorded on the information recording medium 16 at the same time.

On the other hand, in step S25, if the CDA processing section 142 determines that the selected unused area is smaller than the maximum division criteria value MAS (NO at S25), the process is moved to step S28.

In step S28, the minimum division criteria value calculation section 147 calculates the minimum division criteria value MIS of an area corresponding to the unused area selected at step S24 using Equation 1.

In step S29, the CDA processing section 142 determines whether the unused area which is determined to be equal to or smaller than the division criteria value at step S25 or a fractional area generated at step S27 exceeds the minimum division criteria value MIS. If the unused area or the fractional area exceeds the minimum division criteria value MIS (YES at S29), the unused area or the fractional area is reserved as one CDA (S31).

On the other hand, in step S29, if the CDA processing section 142 determines that the unused area determined to be equal to or smaller than the division criteria value at step S25 or the fractional area generated at step S27 equals to or smaller than the minimum division criteria value MIS (NO at S29), the unused area or the fractional area is rendered into a nonuse area (S30).

In the example shown in FIG. 5C, the fractional area on the right end indicated by a grid pattern has a size equal to or smaller than the minimum division criteria value MIS, and it is determined NO at step S29. Thus, the fractional area is a nonuse area. However, if this fractional area is larger than the minimum division criteria value, and it is determined YES at step S29, the area is reserved as one CDA. Herein, the fractional area determined as a nonuse area may be reserved as an area for recording only text data stream.

In step S32, when the CDA processing section 142 finishes selecting all the unused areas on the information recording medium 16 with reference to the free space list (YES at S32), the process is moved to step S33. If there is any unused area on the information recording medium 16 which is not selected yet (NO at S32), the process returns to step S24, the next unused area is selected, and a process for reserving the CDA for the selected unused area is performed.

The CDA processing section 142 passes the CDA information of the CDA reserved in this way to the CDA stock management section 144. The CDA stock management section 144 manages the CDAs in accordance with the CDA information.

In step S33, the CDA stock management section 144 decides the order of using the unused CDAs. The order of using the CDAs may be decided by the CDA processing section 142.

For example, if the information recording medium 16 has a plurality of used areas or defect areas as shown in FIG. 8A, with the conventional information recording device, the unused area is picked out from the information recording medium 16, and the entire unused area is reserved as one CDA if the picked out unused area satisfies Equation 2. Thus, as shown in FIG. 8B, the sizes of the CDAs vary largely depending upon the size of the unused areas.

On the other hand, with the present information recording device 1, the unused areas represented as open squares in FIG. 8A which exceed the maximum division criteria value MAS are divided by the division criteria value MAS and each of them is reserved as one CDA (areas with a number of small black dots inside in FIG. 8C). Thus, the size of the CDAs becomes constant and stable irrespective of the size of unused areas.

Areas with both or either of a used area and a defect area interposed therebetween as shown in FIG. 8A may be reserved as one CDA. In such a case, the one CDA includes a used area and/or a defect area, but can be reserved as one CDA as long as it can be treated as one logically continuous area. However, if the logically continuous area is considered, the explanation may be complicated. Thus, the CDA which is physically and logically continuous one area is discussed in the present embodiment.

As described above, according to the present information recording device 1, the worst value of the minimum division criteria value MIS for the information recording medium 16 is estimated, and a certain margin is added to the estimated value to obtain the division criteria value MAS. The unused areas are divided by the division criteria value MAS, and each of the obtained areas is reserved as one CDA. Thus, even though the information recording medium 16 includes only one unused area as shown in FIG. 5A, a plurality of CDAs can be reserved as shown in FIG. 5C. As a result, a plurality of video and audio streams can be recorded at the same time. Even when the information recording medium 16 includes a plurality of used areas or defect areas as shown in FIG. 8A, the unused area is divided by the division criteria value MAS and each of them is reserved as one CDA. Thus, a variance in the size of CDA can be reduced.

In the present embodiment, a plurality of video and audio streams are recorded at the same time. However, the present invention is not limited to such an example, and a video and audio stream and a text data stream may be recorded at the same time.

Embodiment 2

Next, an information recording device 1a according to Embodiment 2 of the present invention will be described. The information recording device 1a according to Embodiment 2 includes many parts that are identical to those of the information recording device 1 according to Embodiment 1. Thus, the block diagram shown in FIG. 2 which is used for embodiment 1 is also used as a block diagram of the information recording device 1a. Components same as those of Embodiment 1 will not be described, and only different components will be explained. A feature of the information recording device 1a according to Embodiment 2 is that a method for reserving the CDAs on the information recording medium 16 is different from that in Embodiment 1.

Figure 9:
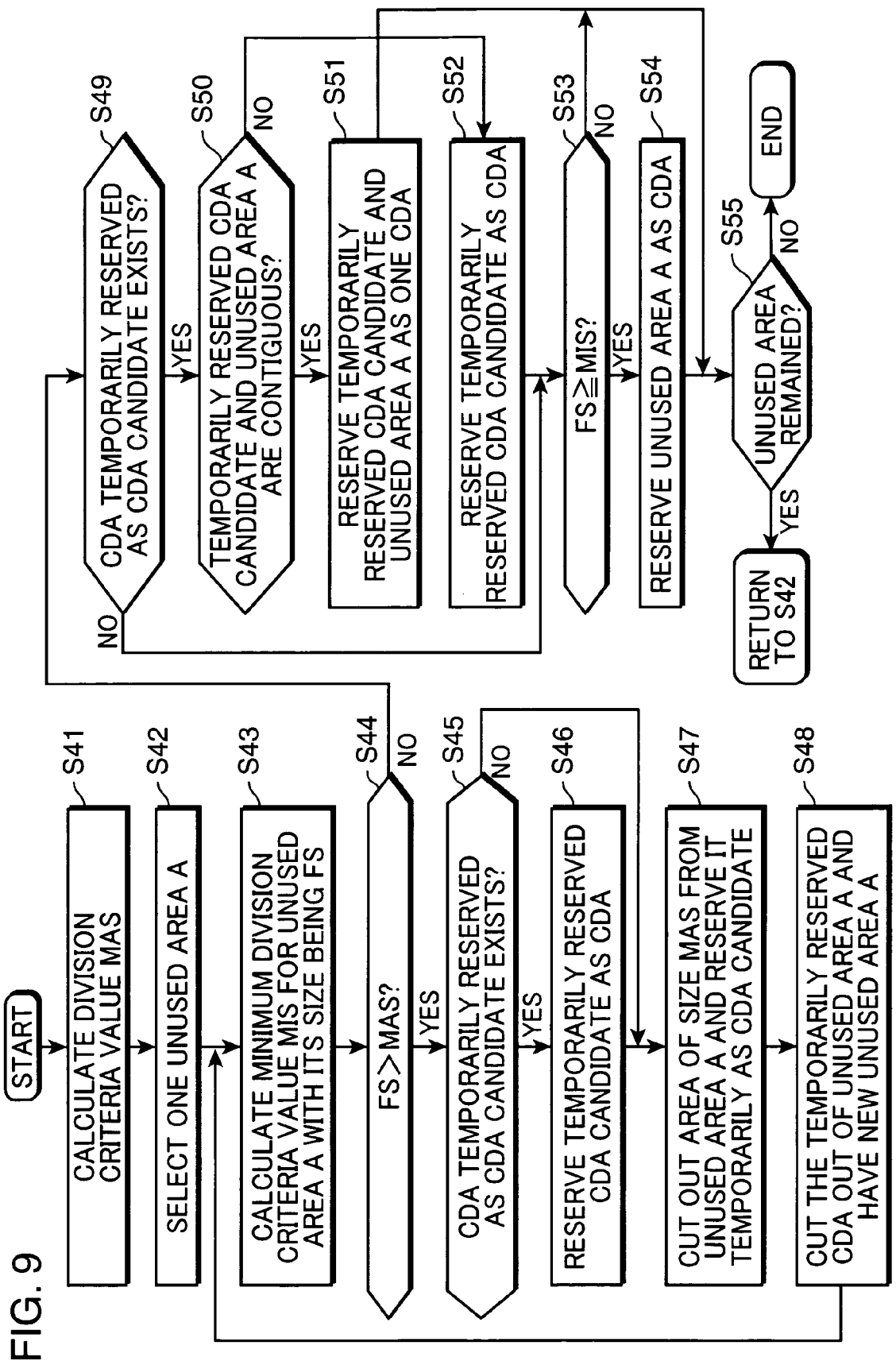
FIG. 9 is a flow chart showing a process by an information recording device according to Embodiment 2 to reserve the CDAs.

FIG. 9 is a flow chart showing a process by the information recording device 1a to reserve CDAs according to Embodiment 2. As in Embodiment 1, when the file system section 14 receives an instruction to record a video and audio stream on the information recording medium 16, the CDA processing section 142 has the division criteria value calculation section 146 calculate the division criteria value MAS in step S41. The definition of the division measurement value and the method for determination are similar to those in Embodiment 1, and thus, the description thereof is omitted.

In step S42, CDA processing section 142 selects one unused area with reference to the free space list of the free area management section 143 (S42). In step S43, the CDA processing section 142 has the division criteria minimum value calculation section 147 calculate the minimum division criteria value MIS for the selected unused area A.

The method for calculating the minimum division criteria value MIS is same as that in Embodiment 1, and thus, the explanation thereof is omitted. In step S44, the CDA processing section 142 determines whether the size FS of the unused area A is larger than the division criteria value MAS or not.

In step S44, if the size FS is larger than the division criteria value MAS (YES at S44), the CDA processing section 142 determines whether there is a CDA which is reserved as a CDA candidate at that point (S45).

In step S45, if the CDA processing section 142 determines that there is a CDA which is temporarily reserved as a CDA candidate (YES at S45), it reserves the temporarily-reserved CDA candidate as a CDA (S46), and identifies an area that is from a header address to the division criteria value MAS in the unused area A selected at step S42 or updated at step S48, and temporarily reserves the identified area as a CDA candidate (S47).

In step S48, the CDA processing section 142 cuts the CDA which is temporarily reserved as the CDA candidate out of the unused area A and the remaining area becomes a new unused area A. Then, the value of the size FS is updated to a value, FS minus MAS, and the process returns to step S43. In such a case, the CDA processing section 142 again calculates the minimum division criteria value MIS for the new unused area A (S43), and repeats the process from step S44.

The CDA processing section 142 repeats the process from step S44 to step S48 until the value of the size FS becomes equal to or smaller than the division criteria value MAS. In this way, CDAs having the size of division criteria value MAS are reserved on the unused area A selected at step S42.

At step S45, if the CDA processing section 142 determines that there is no CDA temporarily reserved as a CDA candidate (NO at S45), the process is moved to step S47.

Reserving CDAs means registering unused CDAs to the CDA stock management section 144. An order of using the reserved CDAs is determined similarly as in Embodiment 1. In a condition of determining YES at step S44, ">" is used, but "≧" may also be used.

In step S49, when there is a CDA which is temporarily reserved as the CDA candidate (YES at S49), the CDA processing section 142 determines whether the temporarily reserved CDA and the unused area A are contiguous (S50).

In step S50, when the unused area A and the CDA which is temporarily reserved as the CDA candidate are contiguous (YES at S50), the CDA processing section 142 reserves a combined area of the CDA which is temporarily reserved as the CDA candidate and the unused area A as one CDA (S51). This is the end of a process for reserving CDAs for the one unused area A selected at step S42.

In this way, the above-described process is performed for all the unused areas A, and the CDAs are reserved for the entire information recording medium 16.

In step S50, if the unused area A and the CDA which is temporarily reserved as a CDA candidate are not consecutively positioned (NO at S50), the CDA which is temporarily reserved as the CDA candidate is reserved as one CDA (S52).

In step S53, the value of the size FS of the unused area A is determined whether it is not smaller than the minimum division criteria value MIS. Specifically, the unused area A remained after reserving the CDA having the size of the division criteria value MAS from the unused area A selected at step S42 is determined whether it is not smaller than the minimum division criteria value MIS.

In step S53, the size FS is determined YES using "≧", but ">" may also be used for determining the size FS.

In step S53, if the size FS of the unused area A is determined not to be smaller than the minimum division criteria value MIS of the CDA (YES at S53), i.e., if MIS≦FS≦MAS, the CDA processing section 142 reserves the unused area A as one CDA because the continuous reproduction of a video and audio stream is possible with such an unused area A (S54).

At step S55, the CDA processing section 142 determines whether there is an unused area A which is not treated with the process for reserving the CDAs on the information recording medium 16 with reference to the free space list (S55). If there is any unused area A which has not been treated with the process for reserving the CDAs (YES at S55), the process returns to step S42 and the next unused area A which is not treated with the process for reserving the CDAs is selected. On the other hand, in step S55, if there is no unused area A which is not treated with the process of reserving the CDAs on the information recording medium 16 (NO at S55), the CDA processing section 142 finishes the process.

Meanwhile, in step S53, if the CDA processing section 142 determines that the size FS of the unused area A is smaller than the minimum division criteria value MIS (NO at S53), the process is moved to step S55 without reserving the unused area A as one CDA, i.e., the process at step S54 is skipped.

With the information recording device 1 according to Embodiment 1, on the information recording medium 16 having a plurality of unused areas as shown in FIG. 8A, the unused areas are divided by the division criteria value MAS as shown in FIG. 8C. The unused areas smaller than the division criteria value MAS become nonuse areas.

On the other hand, with the information recording device 1a according to Embodiment 2, after the unused areas are divided by the division criteria value MAS, an unused area smaller than the division criteria value MAS is combined to the consecutively positioned CDA and reserved as one CDA as shown in FIG. 8C. Thus, more CDAs can be reserved.

However, even in Embodiment 2 of the present invention, if the unused area A smaller than the division criteria value which is divided by the division criteria value MAS is smaller than the minimum division criteria value MIS, it becomes a nonuse area because it may hinder the continuous reproduction of a video and audio stream.

Embodiment 3

Next, Embodiment 3 of the present invention will be described. In Embodiment 3, components same as those in Embodiments 1 and 2 are denoted by the same reference numerals and the explanation thereof is omitted. The block diagram shown in FIG. 2 is also used as a block diagram of an information recording device 1b of Embodiment 3.

A feature of Embodiment 3 is that, when a file or data recorded on the information recording medium 16 is deleted and a new unused area is generated while a process for reserving CDAs on the information recording medium 16 is being performed or a video and audio stream is being recorded on the reserved CDA, CDAs are reserved for this unused area as well.

Figure 10:
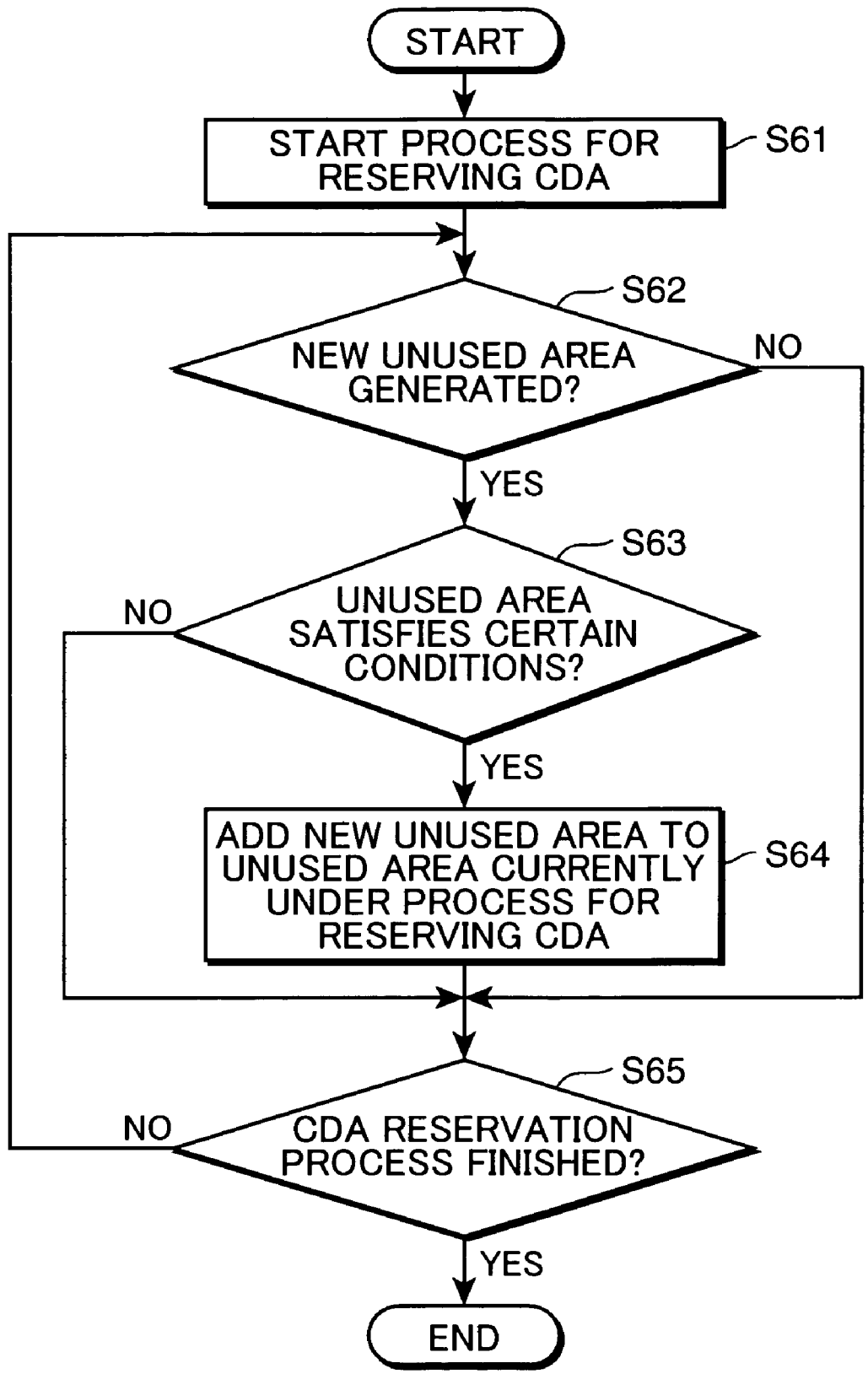
FIG. 10 shows a flow chart showing a process by an information recording device according to Embodiment 3.

FIG. 10 shows a flow chart of the information recording device 1b according to Embodiment 3. First, in step S61, as in Embodiment 1, when the file system section 14 receives an instruction to record a video and audio stream on the information recording medium 16, the information recording device 1b starts the process illustrated by the flow chart shown in FIG. 7 or 9, i.e., a process of reserving CDAs.

In step S62, if the file or data recorded on the information recording medium 16 is deleted and a new unrecorded area is generated (YES at S62), the information recording device 1b determines whether the newly generated unused area satisfies certain conditions, for example, whether it exceeds a certain size or not (S63). When the newly generated unused area satisfies certain conditions (YES at S63), the information recording device 1b adds the newly generated unused area to the unused areas which are currently being treated with the process of reserving the CDAs, and also performs a process to reserve CDAs with respect to the newly generated unused area (S64).

On the other hand, if an unused area is not newly generated at step S62 (NO at S62), the information recording device 1b skips the process of steps S63 and S64 and the process is moved to step S65.

Also, if the newly generated unused area does not satisfy the certain conditions in step S63 (NO at S63), the information recording device 1b moves the process to step S65.

In step S65, if the process for reserving the CDAs is finished (YES at S65), the process is finished. If the process for reserving the CDAs is not finished (NO at S65), the process returns to step S62.

In a flow chart shown in FIG. 10, an example where an unused area is newly generated during the process of reserving CDAs is illustrated. However, the present embodiment is not limited to such an example. If an unused area is newly generated while a video and audio stream is being recorded on the reserved CDA, the newly generated unused area may be treated with the process for reserving the CDAs in addition to the unused areas which are being treated with the process for reserving the CDAs.

Further, if a new unused area is generated while a video and audio stream is being recorded, the process for determining the order of recording may be performed again with respect to the CDAs reserved for the newly generated unused area and the CDAs which have been reserved previously, and then, the recording of the video and audio stream may be continued in accordance with the order. Alternatively, the turn of recording on the CDAs reserved for the newly generated unused area may be put before or after the turn of recording on the CDAs which have been reserved previously, and the recording of the video and audio stream may be continued in accordance with the order.

Furthermore, the process for reserving the CDA is performed with respect to the newly generated unused area, and an area smaller than the division criteria value MAS may be kept away from being combined to the CDAs which have already been reserved, or being combined to specific CDAs among the CDAs which have already been reserved (they may be combined to other CDAs).

As described above, according to the information recording device 1b of Embodiment 3, if an unused area is newly generated during the process for reserving the CDAs, or while the video and audio stream is being recorded, the process of reserving the CDAs is also performed with respect to this unused area. Thus, CDAs can be reserved efficiently.

(1) An information recording device is adapted for reserving continuous areas on an information recording medium and sequentially recording data on the reserved continuous recording areas, comprises: extraction means for extracting unused areas from the information recording medium; determination means for determining whether the unused area extracted by the extraction means exceeds a division criteria value larger than a lower limit of the continuous recording areas which allows continuous reproduction of a video and audio stream; dividing means for dividing unused areas which are determined to have a size exceeding the division criteria value by the determination means by the division criteria value; and management means for reserving areas which are divided by the dividing means and have the size of the division criteria value as the continuous recording areas.

According to this configuration, the unused area with no data recorded thereon is extracted from the information recording medium, and it is determined whether the extracted unused area exceeds a division criteria value larger than the lower limit of the continuous storage area which allows continuous reproduction of a video and audio stream. If it is determined to exceed, the unused area is divided by the division criteria value, and the areas which now have the size of division criteria value are reserved as continuous recording areas. Thus, even when the information recording medium has only one unused area, the unused area is divided by the division criteria value and a plurality of continuous recording areas are reserved on the information recording medium. Accordingly, a plurality of data streams can be recorded at the same time. Since the continuous recording areas have the size larger than the lower limit of the continuous recording area which allows the continuous reproduction of a video and audio stream, when a video and audio stream is sequentially recorded on the continuous recording area, the video and audio stream can be reproduced sequentially.

(2) In the above information recording device, it is preferable that, when the unused area extracted by the extraction means which is divided by the dividing means and becomes smaller than the division criteria value exceeds the lower limit, the management means reserves the area as one continuous recording area.

According to this configuration, when dividing the unused areas by the division criteria value results in an area smaller than the division criteria value (fractional area), the fractional area is reserved as one continuous recording area if it exceeds the lower limit of the continuous recording area which allows the continuous reproduction of the video and audio stream. Thus, it becomes possible to reserve more continuous recording areas with the continuous reproduction of data being allowed.

(3) In the above information recording device, it is preferable that, when the unused area extracted by the extraction means which is divided by the dividing means and becomes smaller than the division criteria value is consecutively positioned to a continuous recording area which has already been reserved, the management means combines the two areas and reserves as one continuous recording area.

According to this configuration, when the fractional area which is smaller than the division criteria value is positioned consecutively to the continuous recording area, the areas are combined and reserved as one continuous recording areas. Thus, more continuous recording areas can be reserved.

(4) In the above information recording device, it is preferable that, when the unused area extracted by the extraction means which is divided by the dividing means and becomes the area smaller than the division criteria value is not consecutively positioned to a continuous recording area which has already been reserved and exceeds the lower limit, the management means reserves the area as one continuous recording area.

According to this configuration, when the fractional area which is smaller than the division criteria value is not consecutively positioned to the continuous recording area which has already been reserved, the fractional area is reserved as one continuous recording area if the fractional area is larger than the lower limit of the continuous recording area which allows the continuous reproduction of a video and audio stream. Thus, more continuous recording areas can be reserved.

(5) In the above information recording device, it is preferable that: when a new unused area is generated on the information recording medium during a process for reserving a continuous recording area, or while data is being recorded on the continuous recording area, the extract means extracts the new unused area; the determination means determines whether the new unused area extracted by the extraction means exceeds the division criteria value; and the division means divides a new unused area which is determined to have a size exceeding the division criteria value by the determination means by the division criteria value.

According to this configuration, if a new unused area is generated during a process for reserving the continuous recording areas or while data is being recorded on a continuous recording area because data in the information recording medium is deleted, or the like, continuous recording areas are reserved for the newly generated unused area as well. Thus, it becomes possible to reserve more continuous recording areas even when the data is being recorded, and the possibility that the continuous recording areas becomes insufficient during recording of the data can be reduced.

(6) In the above information recording device, it is preferable that the lower limit is calculated based on a size and arrangement of at least one of a defect area and a used area included in the unused area extracted by the extraction means.

According to this configuration, the lower limit which ensures the continuous reproduction of a video and audio stream can be calculated with a higher precision.

(7) In the above information recording device, it is preferable that a plurality of lower limits exist for respective areas, and the device further comprises division criteria value calculation means for calculating a predicted value of the largest lower limit among the plurality of lower limits using a predetermined Equation and calculating the division criteria value by adding a predetermined margin to the calculated predicted value.

According to this configuration, the predicted value for the largest lower limit among the lower limits of the continuous recording areas which are calculated for every areas of the information recording medium is calculated using a predetermined Equation. A value obtaining by adding a predetermined margin to the predicted value is a division criteria value. Thus, it becomes possible to quickly calculate the division criteria value without a need for calculating the lower limit for each of the areas.

(8) In the above information recording device, it is preferable that the information recording medium is a medium on which data is recorded using an optical principle or magnetic principle.

According to this configuration, it becomes possible to achieve the effects described in above section (1) with respect to the information recording medium on which data is recorded based on optical principle such as DVDs, CD-ROMs and the like, or based on magnetic principle such as hard discs, and the like.

(9) In the above information recording device, it is preferable that a video and audio stream is recorded on the information recording medium.

According to this configuration, a video and audio stream is recorded on the information recoding medium.

(10) An information recording program is adapted for controlling an information recording device which reserves continuous areas on an information recording medium and sequentially records data on the reserved continuous recording areas, the information recording program allowing the information recording device to function as: extraction means for extracting unused areas from the information recording medium; determination means for determining whether the unused area extracted by the extraction means exceeds a division criteria value larger than a lower limit of the continuous recording areas which allows continuous reproduction of a video and audio stream; dividing means for dividing unused areas which are determined to have a size exceeding the division criteria value by the determination means by the division criteria value; and management means for reserving areas which are divided by the dividing means and have the size of the division criteria value as the continuous recording areas.

According to this configuration, similar effects as those described in above section (1) can be achieved.

(11) Further, a computer readable recording medium is adapted for recording an information recording program for controlling an information recording device which reserves continuous areas on an information recording medium and sequentially records data on the reserved continuous recording areas, the information recording program allowing the information recording device to function as: extraction means for extracting unused areas from the information recording medium; determination means for determining whether the unused area extracted by the extraction means exceeds a division criteria value larger than a lower limit of the continuous recording areas which allows continuous reproduction of a video and audio stream; dividing means for dividing unused areas which are determined to have a size exceeding the division criteria value by the determination means by the division criteria value; and management means for reserving areas which are divided by the dividing means and have the size of the division criteria value as the continuous recording areas.

According to this configuration, similar effects as those described in above section (1) can be achieved.

(12) Further, an information recording method in which an information recording device reserves continuous areas on an information recording medium, comprises: extraction step of allowing the information recording device to extract unused areas from the information recording medium; determination step of allowing the information recording device to determine whether the unused area extracted by the extraction means exceeds a division criteria value larger than a lower limit of the continuous recording areas which allows continuous reproduction of a video and audio stream; dividing step of allowing the information recording device to divide unused areas which are determined to have a size exceeding the division criteria value by the determination means by the division criteria value; and management step of allowing the information recording device to reserve areas which are divided by the dividing means and have the size of the division criteria value as the continuous recording areas.

According to this configuration, similar effects as those described in above section (1) can be achieved.

As described above, multiple types of data streams can be recorded at the same time. This is useful for DVD recorders and the like for recording digital broadcasting programs for which a text data stream is sent together with a video and audio stream.

What is claimed is:

1. An information recording device for reserving a continuous recording area on an information recording medium and sequentially recording data on the reserved continuous recording area, comprising:
   an extraction section which extracts an unused area from the information recording medium;
   a first calculation section which calculates, for the unused area extracted by the extraction section, a minimum division criteria value which corresponds to a lower limit of the continuous recording area which allows continuous reproduction of a video and audio stream;
   a second calculation section which calculates a division criteria value by adding a predetermined margin to the minimum division criteria value;
   a determination section which determines, for the unused area extracted by the extraction section, whether the unused area exceeds the division criteria value being larger than the lower limit of the continuous recording area;
   a dividing section which divides the unused area which is determined to have a size exceeding the division criteria value by the determination section by the division criteria value; and
   a management section which reserves a divisional area which is defined by the dividing section and has the size of the division criteria value as the continuous recording area.

2. An information recording device according to claim 1, wherein, when the unused area extracted by the extraction section which is divided by the dividing section includes a divisional area smaller than the division criteria value and exceeding the lower limit, the management section reserves the divisional area as one continuous recording area.

3. An information recording device according to claim 1, wherein, when the unused area extracted by the extraction section which is divided by the dividing section includes a divisional area smaller than the division criteria value and the divisional area is consecutively positioned to a continuous recording area which has already been reserved, the management section combines the two areas and reserves as one continuous recording area.

4. An information recording device according to claim 3, wherein, when the unused area extracted by the extraction section which is divided by the dividing section includes a divisional area smaller than the division criteria value and exceeding the lower limit, and the divisional area is not consecutively positioned to a continuous recording area which has already been reserved, the management section reserves the divisional area as one continuous recording area.

5. An information recording device according to claim 4, wherein:
when a new unused area is generated on the information recording medium during a process for reserving a continuous recording area, or while data is being recorded on the continuous recording area, the extraction section extracts the new unused area;
the determination section determines whether the new unused area extracted by the extraction section exceeds the division criteria value; and
the division section divides the new unused area which is determined to have a size exceeding the division criteria value by the determination section by the division criteria value.

6. An information recording device according to claim 5, wherein the lower limit is calculated based on a size and arrangement of at least one of a defect area and a used area included in the unused area extracted by the extraction section.

7. An information recording device according to claim 1, wherein:
when a new unused area is generated on the information recording medium during a process for reserving a continuous recording area, or while data is being recorded on the continuous recording area, the extraction section extracts the new unused area;
the determination section determines whether the new unused area extracted by the extraction section exceeds the division criteria value; and
the division section divides the new unused area which is determined to have a size exceeding the division criteria value by the determination section by the division criteria value.

8. An information recording device according to claim 1, wherein the lower limit is calculated based on a size and arrangement of at least one of a defect area and a used area included in the unused area extracted by the extraction section.

9. An information recording device according to claim 1, wherein:
the extraction section extracts a plurality of unused areas from the information recording medium;
the first calculation section calculates a minimum division criteria value for each of the plurality of unused areas; and
the second calculation section calculates a division criteria value by adding a predetermined margin to the maximum value among the minimum division criteria values calculated for the respective unused areas.

10. An information recording device according to claim 1, wherein the information recording medium is a medium on which data is recorded using an optical principle or magnetic principle.

11. An information recording device according to claim 1, wherein a video and audio stream is recorded on the information recording medium.

12. An information recording device for reserving a continuous recording area on an information recording medium and sequentially recording data on the reserved continuous recording area, comprising:
an extraction section which extracts an unused area from the information recording medium;
a determination section which determines whether the unused area extracted by the extraction section exceeds a division criteria value larger than a lower limit of the continuous recording area which allows continuous reproduction of a video and audio stream;
a dividing section which divides the unused area which is determined to have a size exceeding the division criteria value by the determination section by the division criteria value; and
a management section which reserves a divisional area which is defined by the dividing section and has the size of the division criteria value as the continuous recording area;
wherein, when the unused area extracted by the extraction section which is divided by the dividing section includes a divisional area smaller than the division criteria value and the divisional area is consecutively positioned to a continuous recording area which has already been reserved, the management section combines the two areas and reserves as one continuous recording area;
wherein, when the unused area extracted by the extraction section which is divided by the dividing section includes a divisional area smaller than the division criteria value and exceeding the lower limit, and the divisional area is not consecutively positioned to a continuous recording area which has already been reserved, the management section reserves the divisional area as one continuous recording area;
wherein when a new unused area is generated on the information recording medium during a process for reserving a continuous recording area, or while data is being recorded on the continuous recording area, the extraction section extracts the new unused area, the determination section determines whether the new unused area extracted by the extraction section exceeds the division criteria value, and the division section divides the new unused area which is determined to have a size exceeding the division criteria value by the determination section by the division criteria value;
wherein the lower limit is calculated based on a size and arrangement of at least one of a defect area and a used area included in the unused area extracted by the extraction section; and
wherein a plurality of lower limits exist for respective areas, the device further comprising,
a division criteria value calculation section which calculates a predicted value of the largest lower limit among the plurality of lower limits using a predetermined equation and calculates the division criteria value by adding a predetermined margin to the calculated predicted value.

13. An information recording device according to claim 12, wherein the information recording medium is a medium on which data is recorded using an optical principle or magnetic principle.

14. An information recording device according to claim 13, wherein a video and audio stream is recorded on the information recording medium.

15. An information recording program stored on a non-transitory computer-readable storage medium for controlling an information recording device which reserves a continuous recording area on an information recording medium and sequentially records data on the reserved continuous recording area, the information recording program allowing the information recording device to function as:
extraction means for extracting an unused area from the information recording medium;
first calculation means for calculating, for the unused area extracted be the extraction means, a minimum division criteria value which corresponds to a lower limit of the continuous recording area which allows continuous reproduction of a video and audio stream;

second calculation means for calculating a division criteria value by adding a predetermined margin to the minimum division criteria value;

determination means for determining whether the unused area extracted by the extraction means exceeds the division criteria value larger than the lower limit of the continuous recording area;

dividing means for dividing the unused area which is determined to have a size exceeding the division criteria value by the determination means by the division criteria value; and management means for reserving a division area which is defined by the dividing means and has the size of the division criteria value as the continuous recording area.

16. An information recording program according to claim 15, wherein:

the extraction means extracts a plurality of unused areas from the information recording medium;

the first calculation means calculates a minimum division criteria value for each of the plurality of unused areas; and the second calculation means calculates a division criteria value by adding a predetermined margin to the maximum value among the minimum division criteria values calculated for the respective unused areas.

17. A non-transitory computer readable recording medium storing an information recording program for controlling an information recording device which reserves a continuous recording area on an information recording medium and sequentially records data on the reserved continuous recording area, the information recording program allowing a computer installed with the information recording program to function as:

extraction means for extracting an unused area from the information recording medium;

first calculation means for calculating, for the unused area extracted by the extraction means, a minimum division criteria value which corresponds to a lower limit of the continuous recording area which allows continuous reproduction of a video and audio stream;

second calculation means for calculating a division criteria value by adding a predetermined margin to the minimum division criteria value;

determination means for determining whether the unused area extracted by the extraction means exceeds the division criteria value larger than the lower limit of the continuous recording area;

dividing means for dividing the unused area which is determined to have a size exceeding the division criteria value by the determination means by the division criteria value; and management means for reserving a divisional area which is defined by the dividing means and has the size of the division criteria value as the continuous recording area.

18. A computer readable recording medium according to claim 17, wherein:

the extraction means extracts a plurality of unused areas from the information recording medium;

the first calculation means calculates a minimum division criteria value for each of the plurality of unused areas; and the second calculation means calculates a division criteria value by adding a predetermined margin to the maximum value among the minimum division criteria values calculated for the respective unused areas.

19. An information recording method in which an information recording device reserves a continuous recording area on an information recording medium, comprising:

an extraction step of allowing the information recording device to extract an unused area from the information recording medium;

a first calculation step of allowing the information recording device to calculate, for the unused area extracted be the extraction means, a minimum division criteria value which corresponds to a lower limit of the continuous recording area which allows continuous reproduction of a video and audio stream;

a second calculation step of allowing the information recording device to calculate a division criteria value by adding a predetermined margin to the minimum division criteria value;

a determination step of allowing the information recording device to determine whether the unused area extracted by the extraction means exceeds the division criteria value larger than the lower limit of the continuous recording area;

a dividing step of allowing the information recording device to divide the unused area which is determined to have a size exceeding the division criteria value by the determination means by the division criteria value; and a management step of allowing the information recording device to reserve a divisional area which is defined by the dividing means and has the size of the division criteria value as the continuous recording area.

20. An information recording method according to claim 19, wherein:

in the extraction step, a plurality of unused areas are extracted from the information recording medium;

in the first calculation step, a minimum division criteria value for each of the plurality of unused areas is calculated; and in the second calculation step, a division criteria value is calculated by adding a predetermined margin to the maximum value among the minimum division criteria values calculated for the respective unused areas.

21. An information recording device for reserving a continuous recording area on an information recording medium and sequentially recording data on the reserved continuous recording area, comprising:

an extraction section which extracts an unused area from the information recording medium;

a determination section which determines whether the unused area extracted by the extraction section exceeds the division criteria value larger than a lower limit of the continuous recording area which allows continuous reproduction of a video and audio stream;

a dividing section which divides the unused area which is determined to have a size exceeding the division criteria value by the determination section by the division criteria value; and a management section which reserves a divisional area which is defined by the dividing section and has the size of the division criteria value as the continuous recording area wherein a plurality of lower limits exist for respective areas, the device further comprising, a division criteria value calculation section which calculates a predicted value of the largest lower limit among the plurality of lower limits using a predetermined equation and calculates the division criteria value by adding a predetermined margin to the calculated predicted value.

22. An information recording device according to claim 21, wherein the information recording medium is a medium on which data is recorded using an optical principle or magnetic principle.

23. An information recording device according to claim 21, wherein a video and audio stream is recorded on the information recording medium.

24. An information recording device according to claim 21, wherein the extraction section extracts a plurality of unused areas from the information recording medium.

* * * * *